(12) United States Patent
Mehta et al.

(10) Patent No.: US 11,930,786 B1
(45) Date of Patent: Mar. 19, 2024

(54) DOG PAW WASHING AND RINSING DEVICE

(71) Applicants: Nicole Mehta, Douglassville, PA (US); Vishal Metha, Douglassville, PA (US)

(72) Inventors: Nicole Mehta, Douglassville, PA (US); Vishal Metha, Douglassville, PA (US)

(*) Notice: Subject to any disclaimer, the term of this patent is extended or adjusted under 35 U.S.C. 154(b) by 0 days.

(21) Appl. No.: 18/129,327

(22) Filed: Mar. 31, 2023

(51) Int. Cl.
*A01K 13/00* (2006.01)

(52) U.S. Cl.
CPC .................. *A01K 13/001* (2013.01)

(58) Field of Classification Search
CPC ........ A01K 13/001; A61D 7/00; A61D 11/00; A47L 13/58
See application file for complete search history.

(56) References Cited

U.S. PATENT DOCUMENTS

| | | | | |
|---|---|---|---|---|
| 1,977,650 A * | 10/1934 | Sharp | ...................... | D06F 21/02 68/145 |
| 2,212,476 A * | 8/1940 | Kielberg | .................. | A47J 47/18 220/756 |
| 2,565,448 A * | 8/1951 | Brownell | .................. | A47J 47/18 294/170 |
| 3,283,756 A * | 11/1966 | Turley | .................. | A61H 35/006 601/166 |
| 3,556,667 A * | 1/1971 | Kaufman | .................. | A47K 7/03 15/118 |
| 5,810,196 A * | 9/1998 | Lundy | .................... | B44D 3/128 220/570 |
| 6,062,389 A * | 5/2000 | Kent | ........................ | B44D 3/12 220/555 |
| 6,851,391 B1 | 2/2005 | Mulich et al. | | |
| 7,290,651 B2 * | 11/2007 | Irwin | ...................... | A47L 13/51 220/500 |
| D579,661 S * | 11/2008 | Sawdey | ........................ | D3/311 |
| 8,122,852 B2 * | 2/2012 | Skibinski | ............. | A01K 13/001 119/673 |
| 8,636,169 B2 * | 1/2014 | Sampaio | ........... | B65D 25/2891 220/756 |
| D704,935 S * | 5/2014 | Lintz | .............................. | D3/308 |
| D799,126 S | 10/2017 | Shamoon | | |
| D819,972 S * | 6/2018 | Chang | ............................ | D3/315 |
| 10,548,381 B2 * | 2/2020 | Nedjam | ................. | A45D 27/46 |
| D876,835 S * | 3/2020 | Libman | .......................... | D3/310 |
| D888,984 S * | 6/2020 | Solakian | ...................... | D24/227 |
| D895,292 S * | 9/2020 | Barness | ......................... | D3/310 |
| 11,154,177 B1 * | 10/2021 | Johnson | ................. | A47L 13/59 |
| 11,503,804 B1 | 11/2022 | MacPherson | | |
| 2005/0211707 A1 * | 9/2005 | Mak | ........................ | A47J 47/18 220/23.86 |

(Continued)

*Primary Examiner* — Ebony E Evans
(74) *Attorney, Agent, or Firm* — IP Works Law, PLLC (57) ABSTRACT

A dog paw washing and rinsing device is shown and described. The dog paw washing and rinsing device includes a first chamber which includes at least one sidewall rising from a base to an open top edge. A second chamber which includes at least one sidewall rising from a base to an open top edge. The first chamber is coupled to the second chamber such that the first chamber is adjacent to the second chamber. A handle is attached to both the first chamber and the second chamber. A cleaning pad is located within the first chamber. The cleaning pad is placed at an angle as compared to the base of the first chamber.

14 Claims, 8 Drawing Sheets

(56) References Cited

U.S. PATENT DOCUMENTS

| | | | | |
|---|---|---|---|---|
| 2007/0295723 A1* | 12/2007 | Mak | ................ | G01F 19/00 |
| | | | | 220/23.86 |
| 2008/0257384 A1* | 10/2008 | Farrell | ................ | B08B 1/00 |
| | | | | 206/576 |
| 2012/0228293 A1* | 9/2012 | Combs | ................ | A45F 5/02 |
| | | | | 220/660 |
| 2019/0365193 A1* | 12/2019 | Smith | ................ | B65F 1/141 |

* cited by examiner

DOG PAW WASHING AND RINSING DEVICE

BACKGROUND OF THE INVENTION

The present invention relates to devices for washing dog paws. More particularly, the present invention provides a dual chambered paw cleaning and rinsing device.

Presently, there are many devices on the market which are meant to wash a dog's paw. Each of these devices have at least one of drawback, many having several, which make them ineffective. In some instances, these devices are still capable of washing a dog's paw but leave much to be desired after the cleaning is over.

First, the present devices come in many solid colors. There is not a product in existence which is clear. The solid coloring of these devices causes several issues. Neither the user nor the dog can see within the device. This means that a dog may not want to willingly place their paw within. Once an owner gets their dog to place their paw in the device, they must then remove it to check for cleanliness. If the paw is not clean, then they must start the process of convincing their dog to place their paw back into the device. This process may not seem terrible to the owner of a laid back golden retriever, however, for the owner of the rather large, boisterous, spirited chocolate lab this process can be dreadful.

Next, the present devices come in various sizes but not various shapes. The current round shape allows for a few benefits such as the ability to easily add a lid to the product. However, many dog breeds have dew claws. These dew claws stick out away from the dog's paw and become easily stuck on the edges of the round container. This can lead to the exasperation of the problem as detailed above.

Each of the products on the market are only single chambered containers. This means that if one needs to rinse or soak a dog's paw there are a few potential choices. First, they will need to have multiple devices on hand. This is hardly a solution. Another option would be for the user to change the solution within the device and rinsing the pet paw. Each of these solutions calls for the owner to leave their pet and return or to change products midway through the process.

Essentially, when taken together one can imagine, a pet owner attempting to take the paw of a very large chocolate lab, who just wants to run away, and having them comply with the following process: first, having said lab place their paw in a place they do not wish to. Second, having their dew claw become stuck on the device and attempting to free it while still maintaining control. Third, having to remove and check the paw then repeat steps 1 and 2. Now, if the paw needs to be rinsed or soaked you will have to repeat the process. This entire process creates a laughable experience which can only cause stress in one's beloved pet.

In some instances, pet's may suffer from varying conditions requiring treatments to be applied to the pet. In some instances, these treatments and medication need to be applied via soaking the animals paw in a solution. Currently, there are no devices on the market which facilitate such application. Each of the current devices include at least some of the drawbacks as described above.

Consequently, there is a need for an improvement in the art of washing or soaking dog paws. The present invention substantially diverges in design elements from the known art while at the same time solves a problem many people face when attempting to provide their pet with the best possible care. In this regard the present invention substantially fulfills these needs.

SUMMARY OF THE INVENTION

The present invention provides a dog paw washing and rinsing device wherein the same can be utilized for providing convenience for the user when washing a pet's paw. The dog paw washing and rinsing device includes a first chamber which includes at least one sidewall rising from a base to an open top edge. A second chamber which includes at least one sidewall rising from a base to an open top edge. The first chamber is coupled to the second chamber such that the first chamber is adjacent to the second chamber. A handle is attached to both the first chamber and the second chamber. A cleaning pad is located within the first chamber. The cleaning pad is placed at an angle as compared to the base of the first chamber.

Another object of the dog paw washing and rinsing device is to have the open top edge of the first chamber and the open top edge of the second chamber each take the shape of an oval.

Another object of the dog paw washing and rinsing device is to have the open top edge of the first chamber and the open top edge of the second chamber each take the shape of a rectangle.

Another object of the dog paw washing and rinsing device is to have the cleaning pad be removably secured within the first chamber.

Another object of the dog paw washing and rinsing device is to have the cleaning pad be removably secure via a clip to the top edge of the first chamber.

Another object of the dog paw washing and rinsing device is to have a removable soap container.

Another object of the dog paw washing and rinsing device is to have the handle be configured to removably receive the removable soap container.

Another object of the dog paw washing and rinsing device is to have the cleaning pad be comprised of a multitude of bristles rising from a surface.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

With regard to the reference numerals used, the following numbering is used throughout the drawings.

| | |
|---|---|
| 100 | Dog Paw Washing And Rinsing Device |
| 101 | First Chamber |
| 101a | Base |
| 101b | Sidewall |
| 101c | Top Edge |
| 101d | Extended Lip |
| 101e | Aperture |
| 102 | Second Chamber |
| 102a | Base |
| 102b | Sidewall |
| 102c | Top Edge |
| 102d | Extended Lip |
| 103 | Cleaning Pad |
| 103a | Clip |
| 201 | Angle |
| 202 | Handle |
| 202a | Clip |
| 401 | Soap Container |
| 401a | Sealable Opening |
| 401b | Aperture Or Connection Point |
| 402 | Connection Device |
| 403 | Aperture Or Connection Point |
| 404 | Opening |

DETAILED DESCRIPTION OF THE INVENTION

Figure 1:
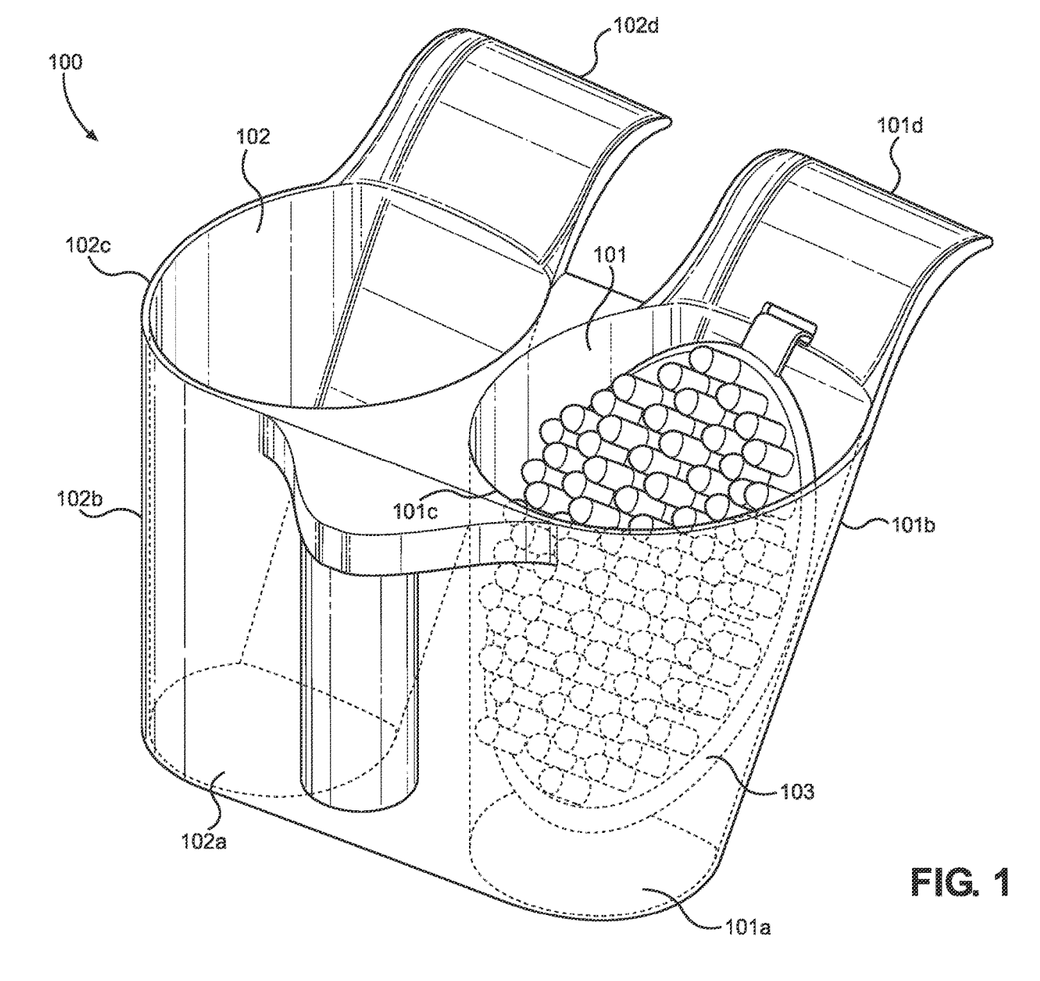
FIG. 1 shows a perspective view of an embodiment of the dog paw washing and rinsing device.

Reference is made herein to the attached drawings. Like reference numerals are used throughout the drawings to depict like or similar elements of the dog paw washing and rinsing device. For the purposes of presenting a brief and clear description of the present invention, a preferred embodiment will be discussed as used for the dog paw washing and rinsing device. The figures are intended for representative purposes only and should not be considered to be limiting in any respect. Referring now to FIG. 1, there is shown a perspective view of an embodiment of the dog paw washing and rinsing device. The dog paw washing device 100 includes a first chamber 101. The first chamber 101 has a base 101a which is connected to at least one sidewall 101b which rises therefrom. The at least one sidewall 101b terminates in an open top edge 101c. In some embodiments the first chamber 101 includes an extended lip 101d which protrudes above the top edge 101c. The extended lip 101d will extend away from part of the first chamber 101 and include a bend. This bend will allow for an animal to better rest their leg or paw thereon due to the curvature of the bend and the larger surface area.

In one embodiment the sidewall 101b is a continuous wall. In this embodiment the sidewall 101b may form the shape of an oval. An oval shape has several advantages over other shapes such as a circle. An oval allows a dog paw to fit within the interior of the chamber 101 without catching their dew claw. Second, the oval will allow for the dog paw to enter at an angle. This is a significant advantage as many dogs will bend their leg at both the elbow joint and wrist joint as they lift their paw from the ground. This means that it is near impossible to have a dog place their entire paw within a round container without tilting the container.

In yet another embodiment the sidewall 101b of the first chamber 101 is clear. Many dogs are skittish of the things they cannot see. If a user attempts to have a dog place their paw into an unseen location the dog may become anxious. Using the clear sidewall 101b the dog will be able to see their paw and not become anxious. This will lead to all around ease of use.

The dog paw washing device 100 includes a second chamber 102. The second chamber 102 has a base 102a which is connected to at least one sidewall 102b which rises therefrom. The at least one sidewall 102b terminates in an open top edge 102c. In some embodiments the second chamber 102 includes an extended lip 102d which protrudes above the top edge 102c. The extended lip 102d will extend away from part of the second chamber 102 and include a bend. This bend will allow for an animal to better rest their leg or paw thereon due to the curvature of the bend and the larger surface area.

In one embodiment the at least one sidewall 102b is a continuous wall. In this embodiment the sidewall 102b may form the shape of an oval. This shape will have the same advantages as above. In yet another embodiment the at least one sidewall 102b of the second chamber 102 is clear.

The first chamber 101 is coupled to the second chamber 102. In the shown embodiment the chambers are coupled side by side. This allows for the chambers to share a sidewall in some embodiments. In another embodiment the portion of the sidewall 101b where the first chamber 101 and second chamber 102 are coupled is filled in with additional material. This will allow for a strong and solid connection regardless of the size and shape of the respective sidewalls 101b, 102b. Further, this additional material may serve to add weight and sturdiness to the dog paw washing and rinsing device.

Within the first chamber 101 is a cleaning pad 103. The cleaning pad 103 is described as being located in the first chamber 101 herein, however, one of ordinary skill in the art will understand that the cleaning pad 103 could be placed in either the first chamber 101 or the second chamber 102 and not depart from this invention. Therefore, the chamber having the cleaning pad 103 therein will be considered the first chamber 101 and the second chamber 102 shall be the chamber without a cleaning pad 103. Further, the addition of a second cleaning pad in the second chamber 102 shall not be removed from the present invention and it is conceived as part of this disclosure that a cleaning pad 103 may be locating in both chambers 101 and 102.

The cleaning pad 103 is placed within the first chamber 101 at an angle as compared to the at least one sidewall 101b. This will allow the dog paw to be cleaned even when entering the chamber on an angle. In one embodiment the cleaning pad 103 includes a base 103a having a plurality of bristles rising therefrom. In one embodiment the bristles are made from a silicon material. This allows for the bristles to be made of varying hardness and to be easily clean. In one embodiment the base 103a is a solid base. In one embodiment the cleaning pad 103 is made from silicon. This will allow for the cleaning pad 103 to be easily cleaned for reuse.

Figure 2A:
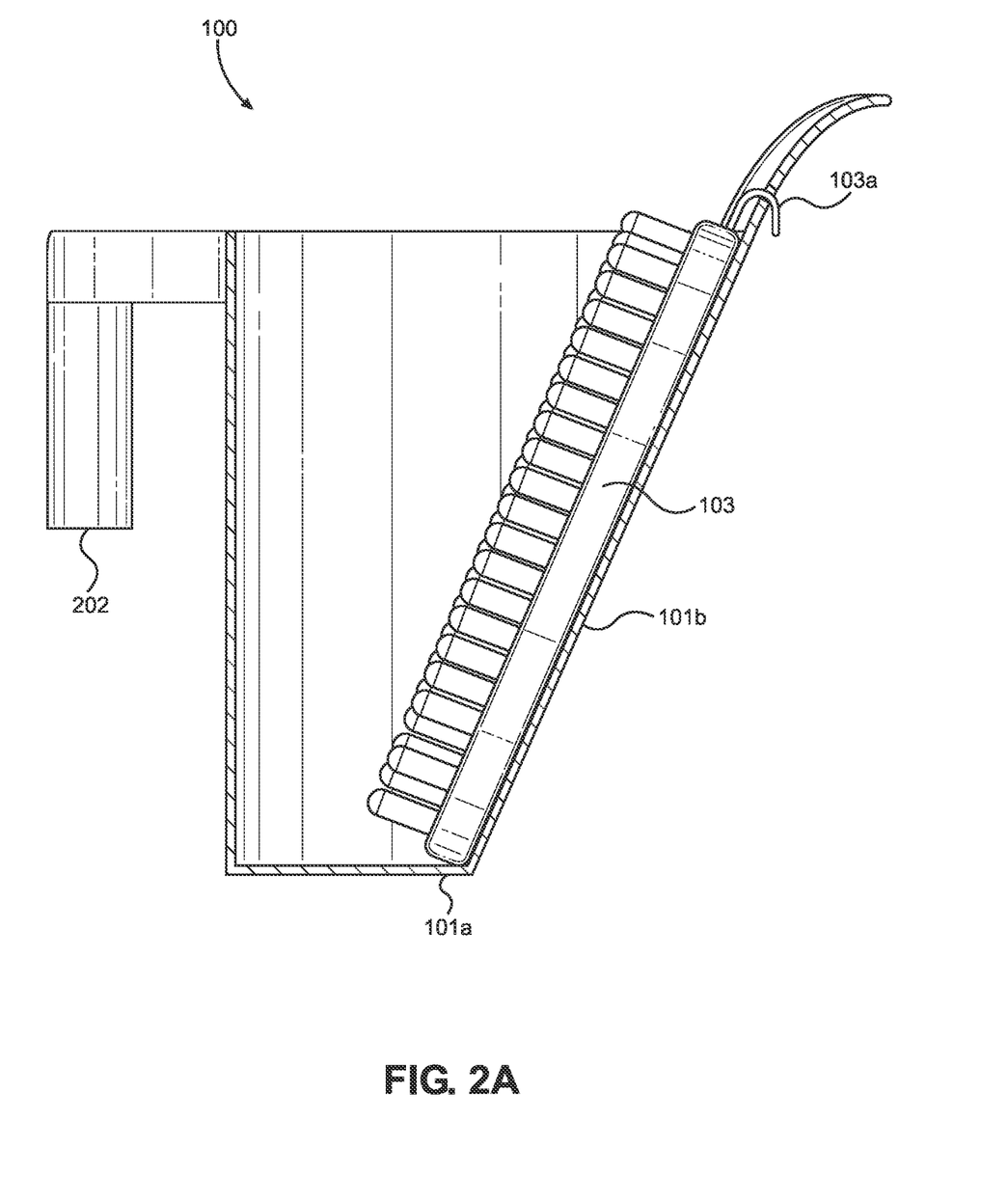
FIG. 2A shows a side view of an embodiment of the dog paw washing and rinsing device.
Figure 2B:
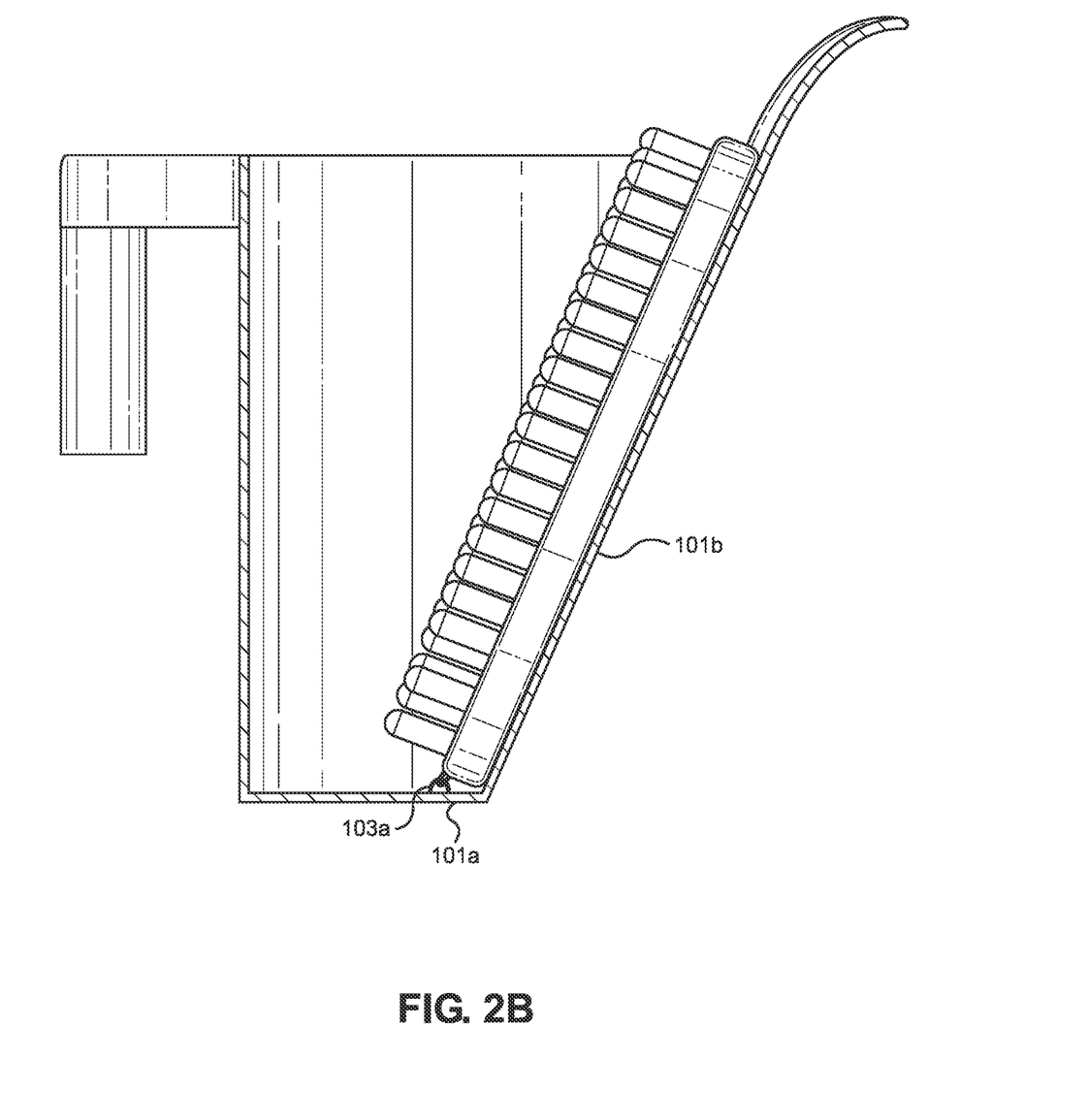
FIG. 2B shows a side view of an embodiment of the dog paw washing and rinsing device.

Referring now to FIG. 2A and FIG. 2B, there is shown side views of embodiments of the dog paw washing and rinsing device 100. From this view the angle 201 of the cleaning pad 103 can be better seen. In yet another embodiment, as seen here, the angle 201 is not compared to the sidewall 101b but to the base 101a. In this embodiment the sidewall 101b is angled as well. This allows for the cleaning pad 103 to be entirely flexible and not need a solid base to support the pad.

The dog paw washing and rinsing device 100 includes a handle 202. The handle 202 extends away from the chambers. In one embodiment the handle 202 wraps down such that it is substantially parallel with the at least one sidewall 101b, 102b. In another embodiment the handle 202 is connected to both the top of the dog paw washing and rinsing device 100 closes to the top edge 101c of the chambers and the base 101a of the chambers. This will allow it to be connected to the chambers in multiple places.

In various embodiments the cleaning pad 103 is removable. In various embodiments the cleaning pad 103 includes various connections devices. In one embodiment a clip 103a is used to secure the cleaning pad 103 in place. In one embodiment the clip 103a is located such that the cleaning pad 103 will secure to the base 101a of the dog paw washing and rinsing device 100. On another embodiment as described below the clip 103a is located at the top of the cleaning pad 103. In yet other embodiments there may be multiple clips. Here a clip 103a is used to describe not just the traditional clip but many attachment means. It is contemplated as part of this disclosure that there may be many ways to secure the cleaning pad 103 within the chamber such that the function is maintained.

Figure 3:
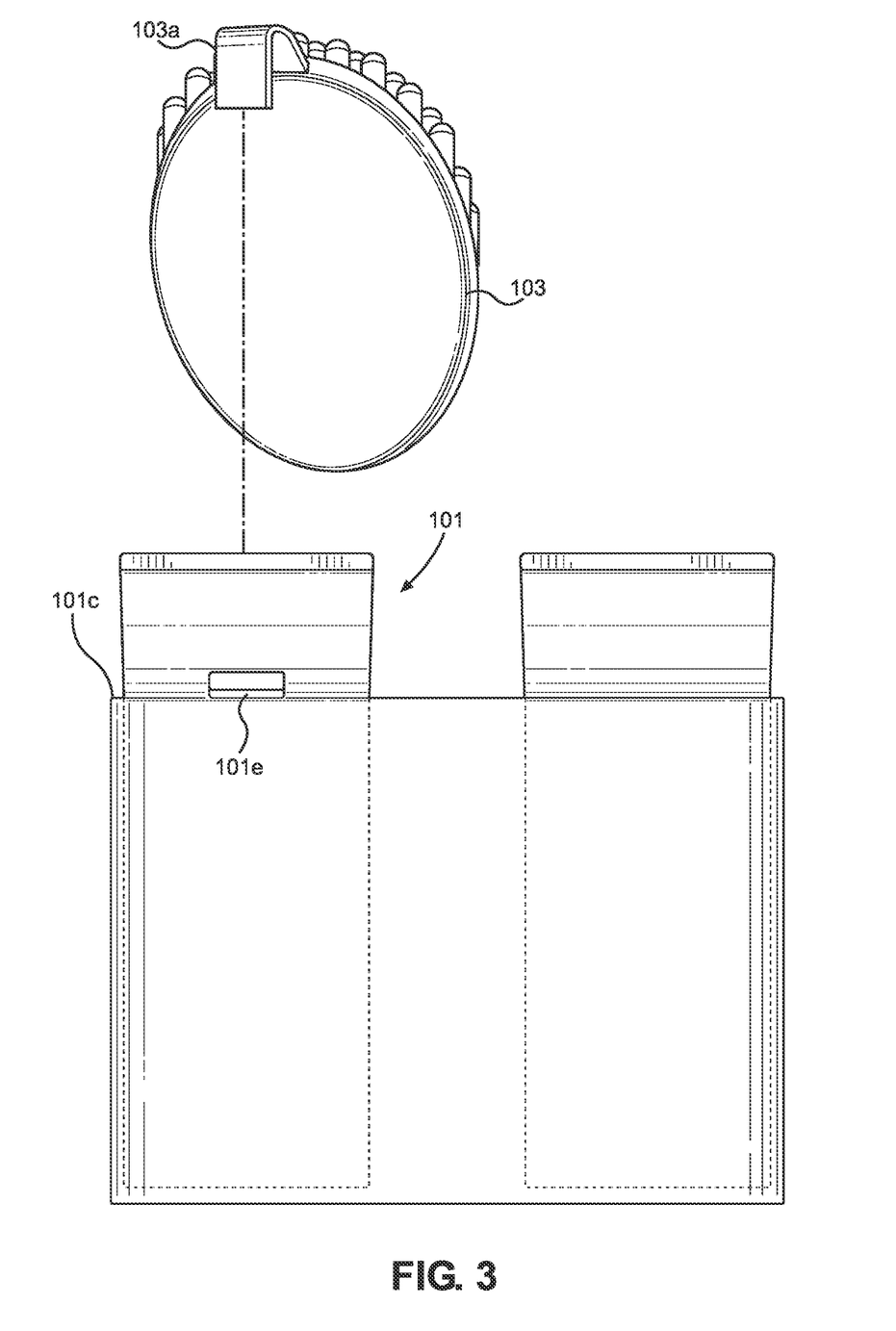
FIG. 3 shows a front partially exploded view of an embodiment of the dog paw washing and rinsing device.

Referring now to FIG. 3, there is shown a front partially exploded view of an embodiment of the dog paw washing and rinsing device. In one embodiment the cleaning pad 103 is removable from the first chamber 101. In this embodiment the different cleaning pads may be inserted for different purposes. In another embodiment this removal will allow for easier cleaning of the cleaning pad 103 prior to continued use.

In one embodiment the cleaning pad 103 includes a clip 103a located at one end. The clip 103a will allow for the cleaning pad 103 to be removably secured about the top edge 101c of the first chamber 101. This clip 103a will hold the cleaning pad 103 in place while the device in is use. In one embodiment the dog paw washing and rinsing device includes an aperture 101e which will allow the clip 103a to secure thereto. This aperture 101e will allow for the clip 103a to fit therein and not be accidentally removed during use.

Figure 4A:
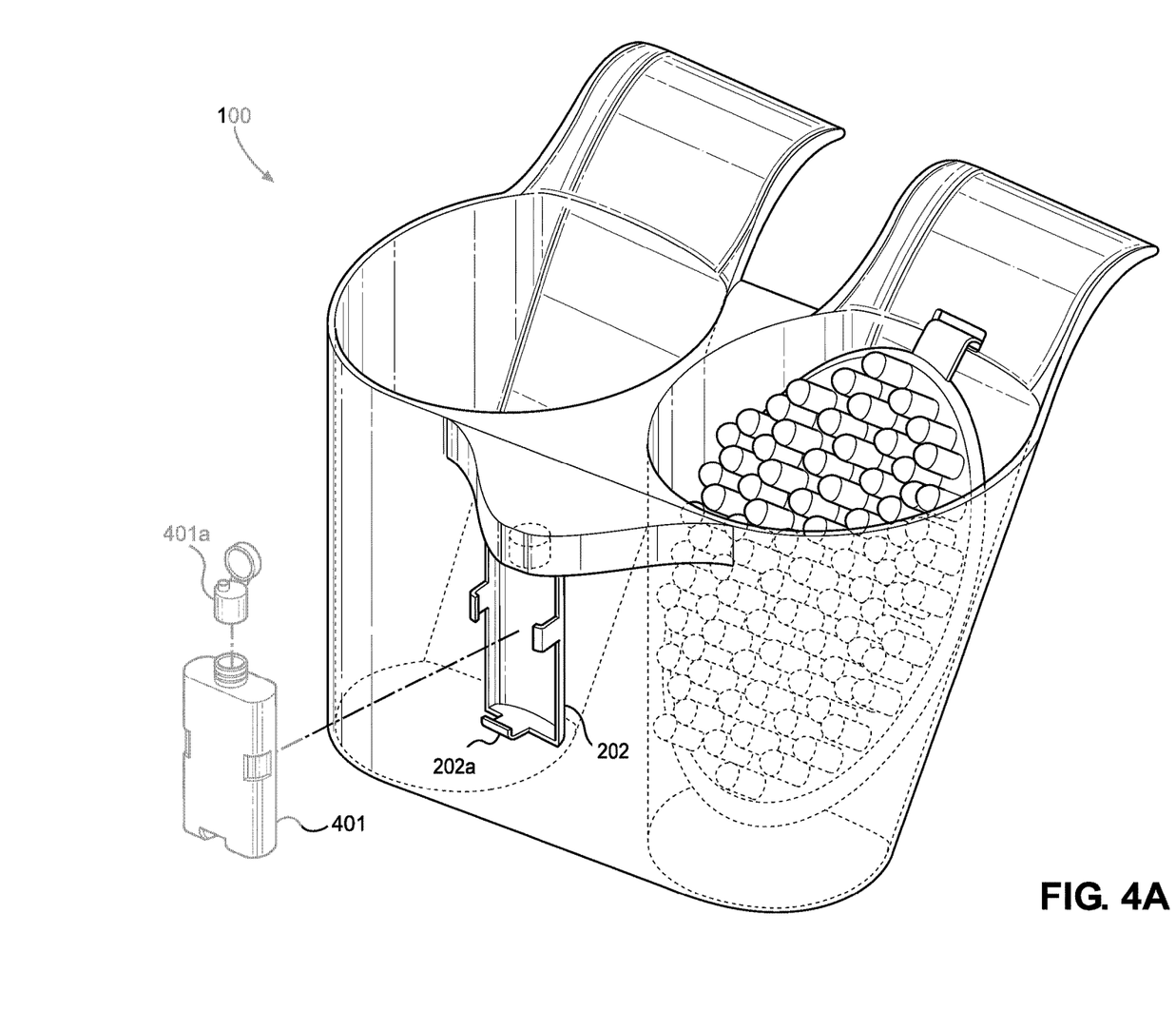
FIG. 4A shows a perspective partially exploded view of an embodiment of the dog paw washing and rinsing device.
Figure 4B:
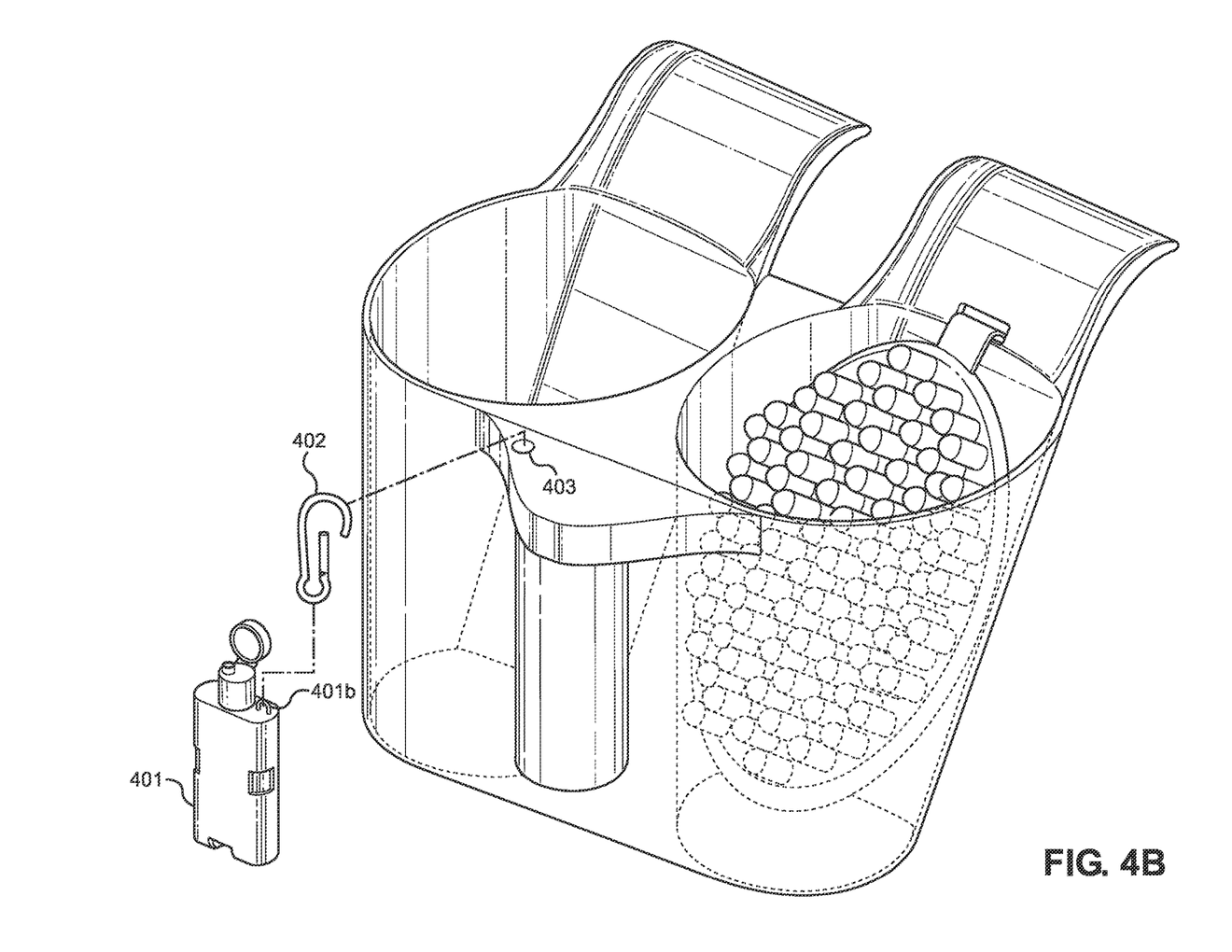
FIG. 4B shows a perspective partially exploded view of an embodiment of the dog paw washing and rinsing device.
Figure 4C:
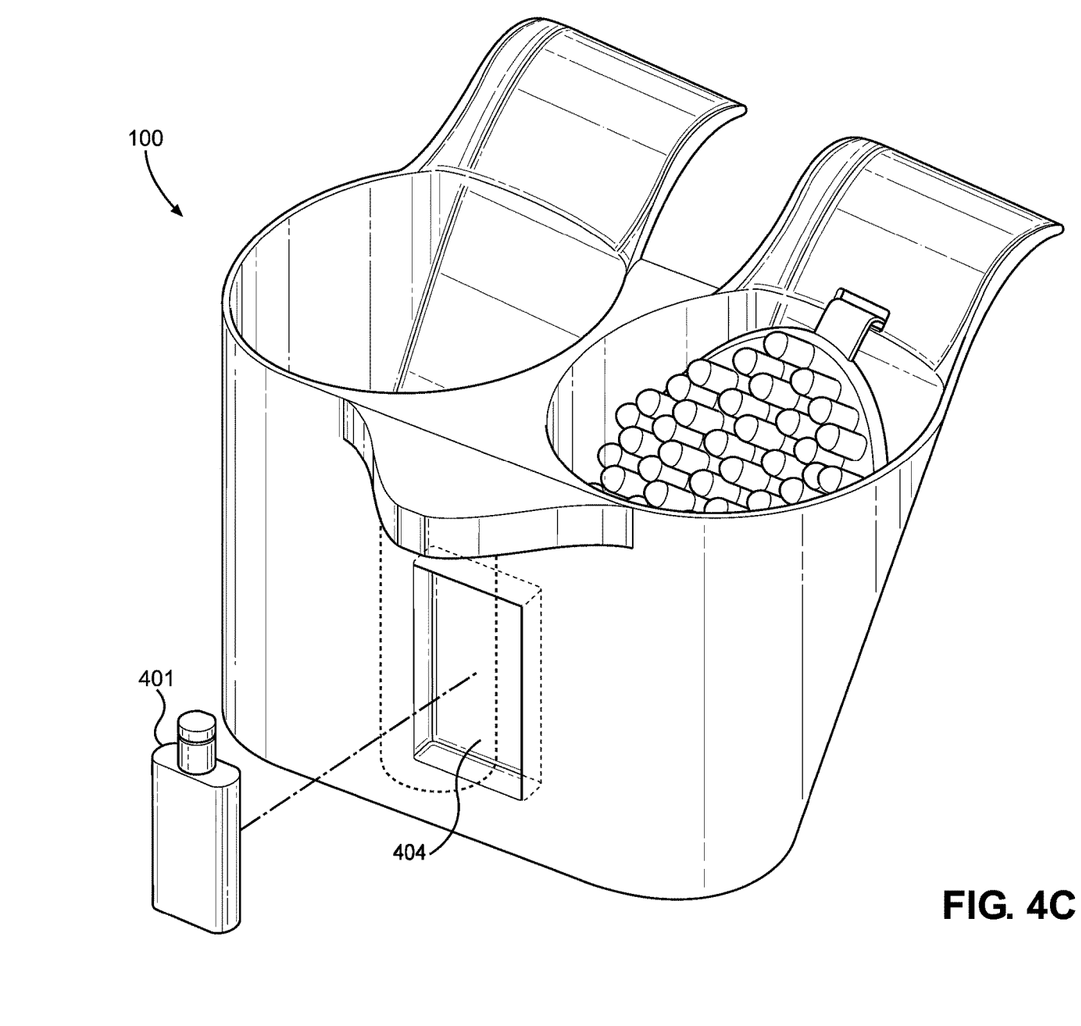
FIG. 4C shows a front partially exploded view of an embodiment of the dog paw washing and rinsing device.

Referring now to FIG. 4A, FIG. 4B, and FIG. 4C, there is shown various views of embodiments of the dog paw washing and rinsing device 100 including a soap container 401. In yet another embodiment the dog paw washing and rinsing device 100 includes a removable soap container 401. The removable soap 401 container may take various shapes and sizes. However, the removable soap container 401 shall have an interior volume and a sealable opening 401a. The opening may be sealed via various types of lids known to secure soap within a vessel. Further, it shall be understood that while labeled a soap container, the removable soap container 401 shall have the potential to secure any solution deemed necessary by a user.

In one embodiment the removable soap container 401 is secured to the dog paw washing and rinsing device 100 via a clip 402. In another embodiment the removable soap container 401 is designed to be removably secured within the handle 202. In one embodiment the removable soap container 401 fits within the handle 202. In another embodiment the handle 202 is configured to have at least one clip 202a therein. In this embodiment the removable soap container 401 is configured to fit within the handle 202 and be secured by the at least one clip 202a.

In another embodiment the soap container 401 contains an aperture or connection point 401b. A connection device 402, such as a d-ring, key ring, or carabiner, is then used to secure the soap container 401 to the dog paw washing and rinsing device via the aperture or connection point 401b. In this embodiment the dog paw washing and rinsing device 100 contains an aperture or connection point 403 which will allow for the connection device 402 to secure thereto.

In yet a further embodiment the soap container 401 secures directly into an opening 404 of the dog paw washing and rinsing device 100. In one embodiment this opening 404 will secure the soap container 401 via a friction fit. In another embodiment a clip 402 may be used to secure the soap container 401 in place.

Figure 5:
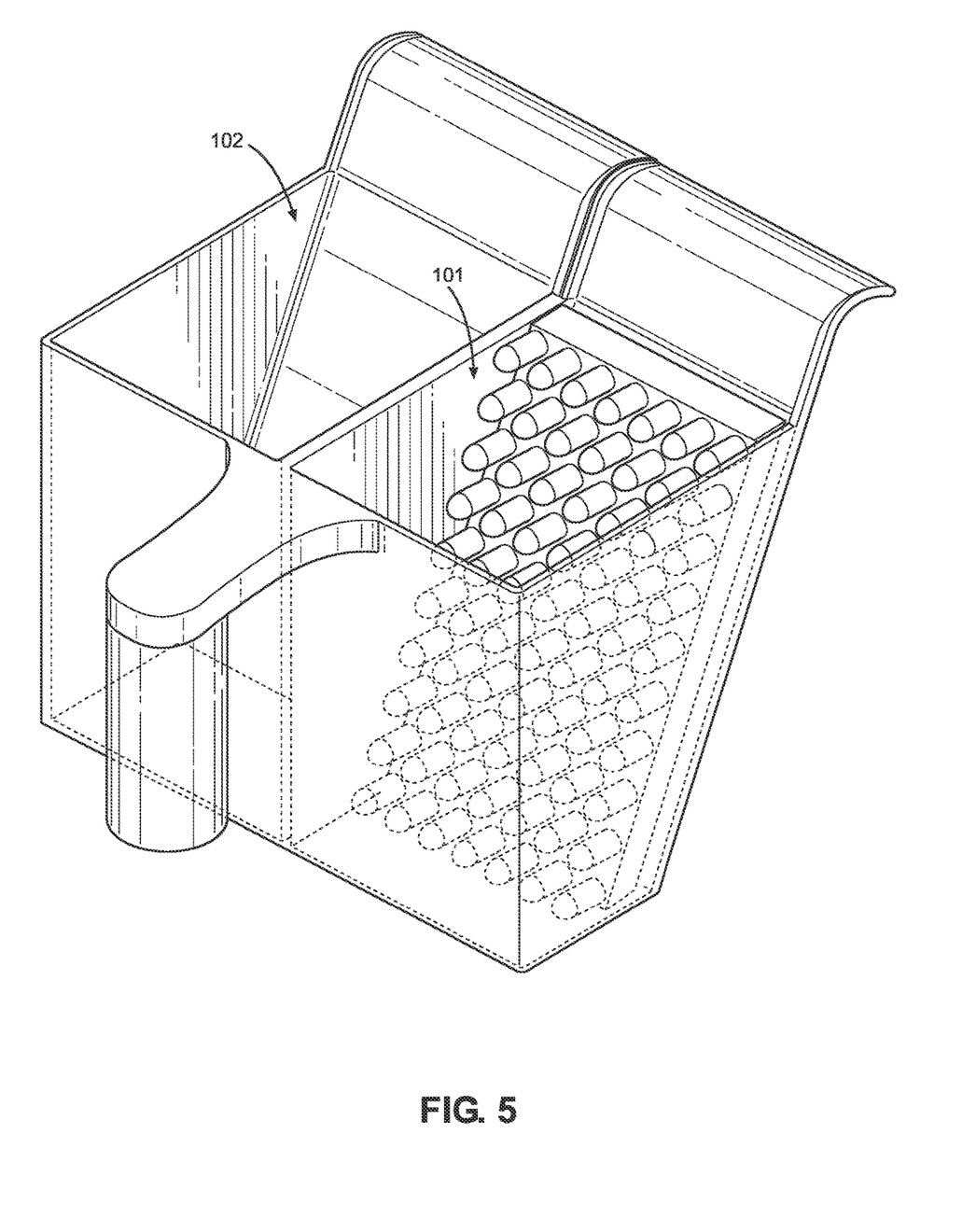
FIG. 5 shows a perspective view of an embodiment of the dog paw washing and rinsing device having rectangular chambers.

Referring now to FIG. 5, there is shown a perspective exploded view of an embodiment of the dog paw washing and rinsing device. In another embodiment the first chamber 101 and the second chamber 102 may take various shapes. In one embodiment the first chamber 101 and the second chamber 102 take the shape of a rectangle.

This embodiment does not diverge significantly from the pervious disclosures and shares many of the same advantages. Further, each of the features as previously described will also be used in this embodiment.

The uses described below are not in reference to FIG. 5 but the dog paw washing and rinsing device in general. Each depiction of the device will facilitate these uses and benefits. In use the dog paw washing and rinsing device may be used for several different reasons. One reason is simply to clean a dog's paw after it has become dirty. This process will include having a dog place their paw against the cleaning pad and move it there along. This will clean any dirt or other grime from their paw. Next the dog's paw will be placed in the chamber opposite the chamber with the cleaning pad. In this embodiment the dog's paw can be rinsed in this chamber.

In another embodiment the dog may have a medical condition. This condition may require medication. In some instances medications need to be added to water and a dog's paw may need to soak in the solution. Here the solution may be added to one of the chambers then the dog's paw may be soaked therein. The sturdiness of the dog paw washing and rinsing device will aid in the prevention of spilling the solution. Further, the overall design of the device will allow for the dog paw washing and rinsing device to remain upright and for the dog to rest their paw thereon without discomfort.

Here once the paw has soaked for the desired amount of time the paw may then be cleaned using the cleaning pad. Next, the solution may be rinsed from the paw using the second chamber. This will allow an owner to both soak the dog's paw and rinse it of the solution without having to change devices or solutions.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A dog paw washing and rinsing device, the device comprising:
   a first chamber comprising of at least one sidewall rising from a base to an open top edge;
   wherein the first chamber is configured to receive a dog paw therein;
   a second chamber comprising of at least one sidewall rising from a base to an open top edge;
   wherein the second chamber is configured to receive a dog paw therein;
   the first chamber is coupled to the second chamber, wherein the first chamber is adjacent to the second chamber; and
   wherein the first chamber is separate from the second chamber such that each the first chamber and the second chamber is configured to receive an independent and different solution from the other;
   a handle attached to both the first chamber and the second chamber;
   a cleaning pad secured within the first chamber; wherein the cleaning pad is placed at an angle as compared to the base of the first chamber;
   a removable soap container, wherein the handle is configured to removably receive the removable soap container.

2. The dog paw washing and rinsing device of claim 1, wherein the open top edge of the first chamber and the open top edge of the second chamber each take the shape of an oval.

3. The dog paw washing and rinsing device of claim 1, wherein the open top edge of the first chamber and the open top edge of the second chamber each take the shape of a rectangle.

4. The dog paw washing and rinsing device of claim 1, wherein the cleaning pad is removably secured within the first chamber.

5. The dog paw washing and rinsing device of claim 4, wherein the cleaning pad is removably secure via a clip to the top edge of the first chamber.

6. The dog paw washing and rinsing device of claim 1, wherein the cleaning pad is comprised of a multitude of bristles rising from a surface.

7. A dog paw washing and rinsing device, the device comprising:
   a first chamber comprising of at least one sidewall rising from a base to an open top edge;
   wherein the first chamber is configured to receive a dog paw therein;
   a second chamber comprising of at least one sidewall rising from a base to an open top edge;
   wherein the second chamber is configured to receive a dog paw therein;
   the first chamber is coupled to the second chamber, wherein the first chamber is adjacent to the second chamber; and
   wherein the first chamber is separate from the second chamber such that each the first chamber and the second chamber is configured to receive an independent and different solution from the other;
   a handle attached to both the first chamber and the second chamber;
   a cleaning pad secured within the first chamber; wherein the cleaning pad is placed at an angle as compared to the base of the first chamber;
   wherein the first chamber is further comprised of a first extended lip which extends up and away from the first chamber; and
   wherein the second chamber is further comprised of a second extended lip which extends up and away from the second chamber and wherein the first extended lip is separate from the second extended lip.

8. A dog paw washing and rinsing device, the device comprising: a first chamber comprising of at least one sidewall rising from a base to an open top edge, wherein the at least one sidewall is clear;
   a second chamber comprising of at least one sidewall rising from a base to an open top edge, wherein the at least one sidewall is clear;
   the first chamber is coupled to the second chamber, wherein the first chamber is adjacent to the second chamber; and
   wherein the first chamber is separate from the second chamber such that each the first chamber and the second chamber is configured to receive an independent and different solution from the other;
   a handle attached to both the first chamber and the second chamber;
   a cleaning pad secured within the first chamber; wherein the cleaning pad is placed at an angle as compared to the base of the first chamber;
   a removable soap container, wherein the handle is configured to removably receive the removable soap container.

9. The dog paw washing and rinsing device of claim 8, wherein the open top edge of the first chamber and the open top edge of the second chamber each take the shape of an oval.

10. The dog paw washing and rinsing device of claim 8, wherein the open top edge of the first chamber and the open top edge of the second chamber each take the shape of a rectangle.

11. The dog paw washing and rinsing device of claim 8, wherein the cleaning pad is removably secured within the first chamber.

12. The dog paw washing and rinsing device of claim 11, wherein the cleaning pad is removably secure via a clip to the top edge of the first chamber.

13. The dog paw washing and rinsing device of claim 8, wherein the cleaning pad is comprised of a multitude of bristles rising from a surface.

14. The dog paw washing and rinsing device of claim 8, wherein the first chamber is further comprised of an extended lip; and
   wherein the second chamber is further comprised of an extended lip.

* * * * *